US012469222B2

(12) United States Patent
Beaurepaire et al.

(10) Patent No.: US 12,469,222 B2
(45) Date of Patent: Nov. 11, 2025

(54) METHOD, APPARATUS, AND SYSTEM FOR ASSOCIATING AN OBJECT WITH A SPATIAL BUDGET

(71) Applicant: HERE Global B.V., Eindhoven (NL)

(72) Inventors: Jerome Beaurepaire, Nantes (FR); Nicolas Neubauer, Berlin (DE); Jens Unger, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 280 days.

(21) Appl. No.: 18/077,090

(22) Filed: Dec. 7, 2022

(65) Prior Publication Data
US 2024/0193871 A1  Jun. 13, 2024

(51) Int. Cl.
*G06T 19/00* (2011.01)
*G06Q 50/16* (2024.01)

(52) U.S. Cl.
CPC .......... *G06T 19/003* (2013.01); *G06Q 50/16* (2013.01)

(58) Field of Classification Search
CPC . G06T 2207/30196; G06T 2207/30232; G06T 2207/30242; G06T 7/0002; G06T 7/13; G06T 7/20; G06T 7/521; G06T 7/55; G06T 7/70; G06T 7/75; G06F 16/23; G06F 16/235; G06F 16/288; G06F 16/55; G06F 16/583; G06F 16/5846; G06F 16/90335; G06F 17/18; G06F 18/2115
See application file for complete search history.

(56) References Cited

U.S. PATENT DOCUMENTS

2004/0066500 A1  4/2004  Gokturk et al.
2016/0055432 A1  2/2016  Chen et al.
(Continued)

FOREIGN PATENT DOCUMENTS

| JP | 2020130217 A | 8/2020 |
|---|---|---|
| WO | 2018175432 A1 | 9/2018 |
| WO | 2021244961 A1 | 12/2021 |

OTHER PUBLICATIONS

Emmanuel et al., "Portable wireless sensors for object usage sensing in the home: challenges and practicalities", Nov. 2007, 18 pages.
(Continued)

*Primary Examiner* — Ming Wu
(74) *Attorney, Agent, or Firm* — DITTHAVONG, STEINER & MLOTKOWSKI

(57) ABSTRACT

An approach is provided for associating an object with a spatial budget. The approach, for example, involves initiating a scan of an object, an available space, or a combination thereof using a sensor to determine a spatial volume of the object, a spatial volume of the available space for a storage or a placement of the object, or a combination thereof. The approach also involves determining a spatial cost of an object based on the spatial volume of the object. The approach further involves determining an available spatial budget based on the spatial volume of an available space. The approach further involves determining a spatial budget for the object based on the spatial cost of the object and the available spatial budget. The approach further involves providing the spatial budget of the object, the spatial cost of the object, the available spatial budget, or a combination thereof as an output.

19 Claims, 16 Drawing Sheets

(56) References Cited

U.S. PATENT DOCUMENTS

| | | | |
|---|---|---|---|
| 2016/0259308 | A1 | 9/2016 | Fadell et al. |
| 2016/0364935 | A1* | 12/2016 | Koehler ............. G06Q 30/0249 |
| 2018/0189565 | A1 | 7/2018 | Lukierski et al. |
| 2018/0219737 | A1 | 8/2018 | Schulz et al. |
| 2018/0276775 | A1 | 9/2018 | Khurana et al. |
| 2019/0236531 | A1* | 8/2019 | Adato .................. G06Q 10/087 |
| 2019/0325379 | A1* | 10/2019 | Medina .................. A47L 11/28 |
| 2020/0051130 | A1 | 2/2020 | Moore et al. |
| 2021/0110183 | A1 | 4/2021 | Qiu et al. |
| 2021/0165558 | A1 | 6/2021 | Itagaki et al. |
| 2022/0269999 | A1* | 8/2022 | Arumugam ............ G06Q 10/02 |
| 2022/0319029 | A1* | 10/2022 | Pallotti .................. G06T 7/593 |

OTHER PUBLICATIONS

Owen, "It became an anchor for stuff I really want to keep: the stabilising weight of self-storage when moving home and away", Social & Cultural Geography, Published Nov. 2, 2020, 17 pages.

Aron, "Kinect system keeps track of household objects", Magazine issue 2867, May 30, 2012, 2 pages.

Office Action for related U.S. Appl. No. 18/077,083, dated Aug. 7, 2025, 17 pages.

* cited by examiner

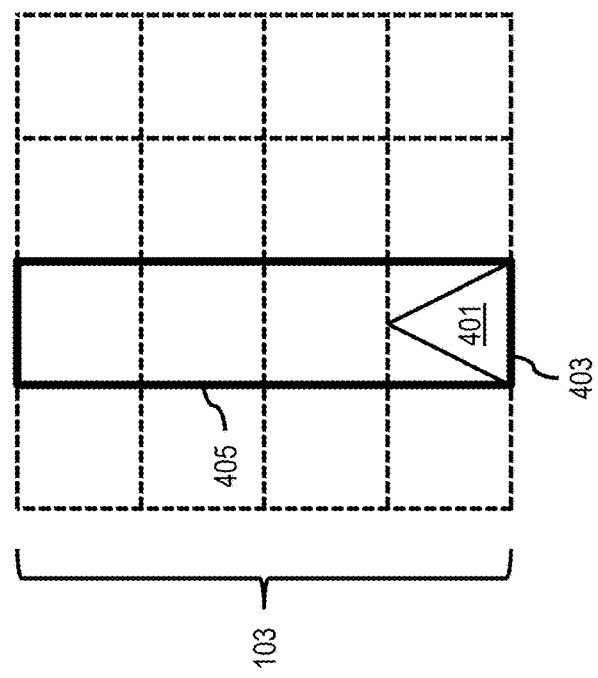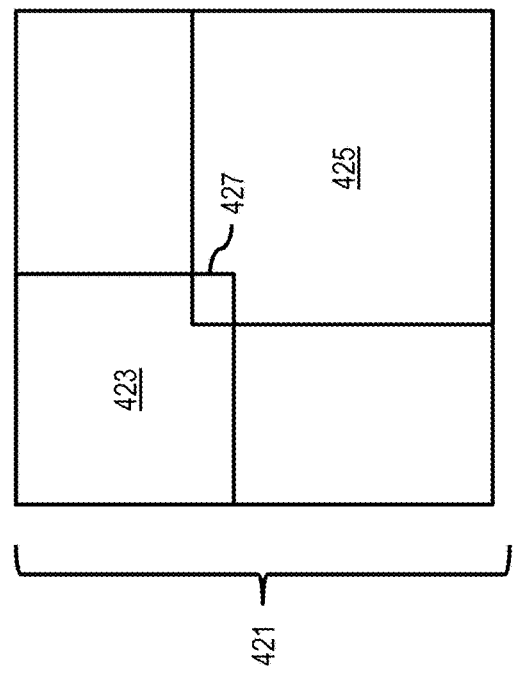
FIG. 4A
FIG. 4B

METHOD, APPARATUS, AND SYSTEM FOR ASSOCIATING AN OBJECT WITH A SPATIAL BUDGET

BACKGROUND

Location-based service providers (e.g., mapping and navigation providers) are continually challenged to provide compelling services and applications. One area of development relates to understanding how objects that are acquired over time can affect a user's space and environment. However, the dynamic nature of what objects are acquired and where they are placed makes automatically detecting and assessing the objects technically challenging.

SOME EXAMPLE EMBODIMENTS

Therefore, there is a need for automatically detecting objects in an environment (e.g., a room or home) and then assessing the spatial impacts of the object (e.g., by associating the object with a spatial budget available in the environment).

According to one embodiment, a method comprises initiating a scan of an object, an available space, or a combination thereof using a sensor to determine a spatial volume of the object, a spatial volume of the available space for a storage or a placement of the object, or a combination thereof. The method also comprises determining a spatial cost of an object based on the spatial volume of the object. The method further comprises determining an available spatial budget based on the spatial volume of the available space. The method further comprises determining a spatial budget for the object based on the spatial cost of the object and the available spatial budget. The method further comprises providing the spatial budget of the object, the spatial cost of the object, the available spatial budget, or a combination thereof as an output. In one embodiment, the method further comprises determining a recommended position to place or store the object in the available space based on the spatial budget of the object. In yet another embodiment, the method further comprises determining a financial cost for the object based on the spatial budget and a real estate cost for the available space.

According to another embodiment, an apparatus comprises at least one processor, and at least one memory including computer program code for one or more computer programs, the at least one memory and the computer program code configured to, with the at least one processor, cause, at least in part, the apparatus to initiate a scan of an object, an available space, or a combination thereof using a sensor to determine a spatial volume of the object, a spatial volume of the available space for a storage or a placement of the object, or a combination thereof. The apparatus is also caused to determine a spatial cost of an object based on the spatial volume of the object. The apparatus is further caused to determine an available spatial budget based on the spatial volume of the available space. The apparatus is further caused to determine a spatial budget for the object based on the spatial cost of the object and the available spatial budget. The apparatus is further caused to provide the spatial budget of the object, the spatial cost of the object, the available spatial budget, or a combination thereof as an output. In one embodiment, the apparatus is further caused to determine a recommended position to place or store the object in the available space based on the spatial budget of the object. In yet another embodiment, the apparatus is further caused to determine a financial cost for the object based on the spatial budget and a real estate cost for the available space.

According to another embodiment, a non-transitory computer-readable storage medium carries one or more sequences of one or more instructions which, when executed by one or more processors, cause, at least in part, an apparatus to initiate a scan of an object, an available space, or a combination thereof using a sensor to determine a spatial volume of the object, a spatial volume of the available space for a storage or a placement of the object, or a combination thereof. The apparatus is also caused to determine a spatial cost of an object based on the spatial volume of the object. The apparatus is also caused to determine an available spatial budget based on the spatial volume of the available space. The apparatus is further caused to determine a spatial budget for the object based on the spatial cost of the object and the available spatial budget. The apparatus is further caused to provide the spatial budget of the object, the spatial cost of the object, the available spatial budget, or a combination thereof as an output. In one embodiment, the apparatus is further caused to determine a recommended position to place or store the object in the available space based on the spatial budget of the object. In yet another embodiment, the apparatus is further caused to determine a financial cost for the object based on the spatial budget and a real estate cost for the available space.

In addition, for various example embodiments described herein, the following is applicable: a computer program product may be provided. For example, a computer program product comprising instructions which, when the program is executed by a computer, cause the computer to perform any one or any combination of methods (or processes) disclosed.

According to another embodiment, an apparatus comprises means for initiating a scan of an object, an available space, or a combination thereof using a sensor to determine a spatial volume of the object, a spatial volume of the available space for a storage or a placement of the object, or a combination thereof. The apparatus also comprises means for determining a spatial cost of an object based on the spatial volume of the object. The apparatus further comprises means for determining an available spatial budget based on the spatial volume of the available space. The apparatus further comprises means for determining a spatial budget for the object based on the spatial cost of the object and the available spatial budget. The apparatus further comprises means for providing the spatial budget of the object, the spatial cost of the object, the available spatial budget, or a combination thereof as an output. In one embodiment, the apparatus further comprises means for determining a recommended position to place or store the object in the available space based on the spatial budget of the object. In yet another embodiment, the apparatus further comprises means for determining a financial cost for the object based on the spatial budget and a real estate cost for the available space.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4C are diagrams illustrating example cost factors for computing a spatial cost of an object, according to various example embodiments;

DESCRIPTION OF SOME EMBODIMENTS

Examples of a method, apparatus, and computer program for associating an object with a spatial budget are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
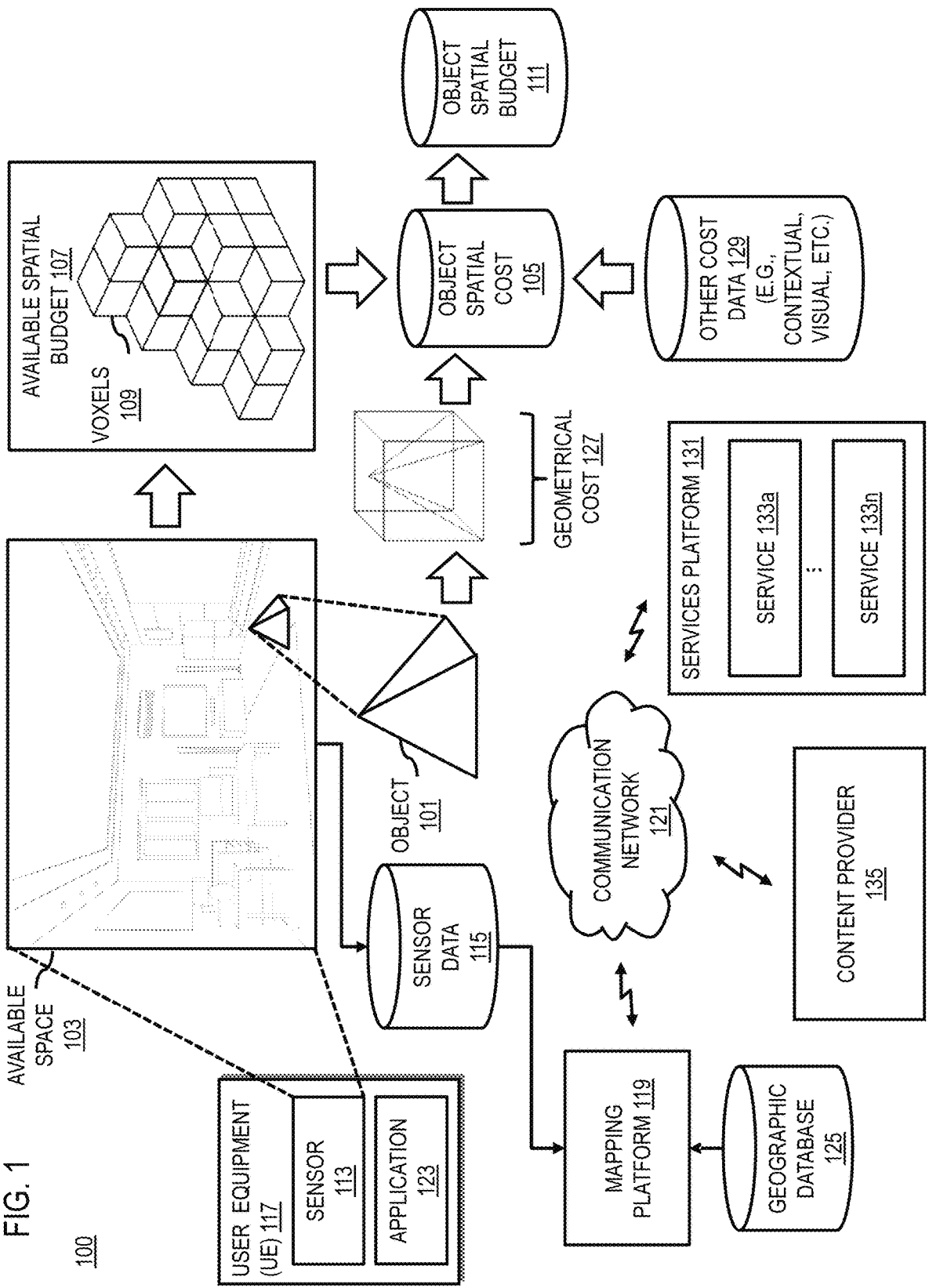
FIG. 1 is a diagram of a system capable of associating an object with a spatial budget, according to one example embodiment.

FIG. 1 is a diagram of a system capable of associating an object with a spatial budget, according to one example embodiment. Many people gather objects (e.g., object 101) over time in the available space 103 in their homes or other environments (e.g., workplaces, storage units, public areas, etc.) which clutters the available space 103 over time, even if those objects 101 are not used any more. It is noted although the various example embodiments may discuss objects 101 that are in homes, it is contemplated that the embodiments are also applicable to any other place or environment such as but not limited to the examples described herein. As used herein, the term "object" refers to any tangible thing that can be placed or otherwise occupies space in a given area (e.g., the available space 103 such as but not limited to person's home, or any other designated volumetric/three-dimensional space, etc.). People generally do not realize that the space taken by objects 101 also has a "cost" associated to it (e.g., an object spatial cost 105), even if this cost is indirect.

To address this issue, the system 100 of FIG. 1 introduces a technical capability to quantify the spatial costs of objects 101 (e.g., object spatial cost 105) and then present the spatial cost 105 so that people realize it and can then take appropriate actions (e.g., keep, sell, give, repurpose, etc. the corresponding objects 101). In one embodiment, the system 100 manages an indoor space (e.g., the available space 103 of a home or other place) by determining spatial costs 105 associated with an object 101 in the available space 103 and computing the spatial budget of the available space 103 (e.g., computed as an available spatial budget 107 represented as volumetric pixels (voxels) 109 or any other cubic/volumetric unit available for storage of objects 101). In one embodiment, the system 100 further uses the object spatial cost 105 to compute a relative cost of the object 101 with respect to the available spatial budget 107 (e.g., represented by an object spatial budget 111) and can link the object spatial budget 111 and/or object spatial costs 105 to an actual financial cost (e.g., based on the financial cost per volume of space of the available space 103). Once people realize or view the object spatial cost 105 and/or object spatial budget 111 associated with specific items or objects 101, this will make them realize that stored objects 101, taking space in their homes or other spaces, are not cost neutral.

This could help trigger a few positive behaviors, among which include but are not limited to:

Giving away unused, underused, or unwanted objects 101, thereby giving them a second life;

Selling unused, underused, or unwanted objects 101, leading to additional revenue;

Possibly realizing that a user does not need such a large home anymore once the home is decluttered of unused, underused, or unwanted objects 101 (e.g., objects 101 no longer needed or used because children are older and have left home), thereby leading to taking a smaller house/flat with a smaller overall footprint for improved efficiency and sustainability; and Giving people more space inside their home once the unused, underused, or unwanted objects 101 are removed.

In other words, the system 100 helps consumers declutter their homes or other spaces and live in a more sustainable way by providing contextual insights (e.g., object spatial costs 105, object spatial budgets 111) about the objects 101 their homes. The system 100, for instance, enables users to quantify an object 101's impact on the available space 103 in their homes by computing the spatial cost 105 and/or spatial budget 111 for object(s) 101 in their homes. In one embodiment, the system 100 can use the spatial cost 105 and/or spatial budget 111 to suggest an area of or position in the available space 103 (e.g., a plane surface such as but not limited to a table, shelf, wall, etc.) where an object 101 would fit based on the object spatial cost 105 and/or spatial budget 111. In another embodiment, the system 101 can provide suggestions or recommendations during a purchase or acquisition of the object 101 based on the computed object spatial cost 105 and/or object spatial budget 111 and the available spatial budget 107 of the place (e.g., the available space 103) where the object 101 is to be placed.

In one embodiment, the system 100 can gather data about objects 101 within a given volumetric (e.g., three-dimensional (3D)) space (e.g., the available space 103 of a home or any other place/environment of interest). In one embodiment, the system 100 use one or more sensors 113 (e.g., a camera sensor, a light detection and ranging (LiDAR) sensor, etc.) to collect data (e.g., sensor data 115) or receive data (e.g., object specification data transmitted or reported by "smart/connected" objects 101 or from a database of object specifications) related to the objects 101 via one or more user equipment (UE) devices 117 (e.g., a mobile device, a smartphone, etc.) having connectivity to a mapping platform 119 via a communication network 121. In one embodiment, the UEs 117 is equipped with or otherwise has connectivity to one or more sensors 113 configured to scan an environment (e.g., the available space 103) and generate sensor data 115 (e.g., image data, LiDAR point clouds, etc.) from which the objects 101 and their properties (e.g., spatial volumes) can be detected or otherwise determined. The UEs 117 can execute one or more applications 123 (e.g., an object cataloging/indexing application, indoor mapping application, camera-based application, a navigation application, and/or any other location-based application) for detecting objects, determining their spatial costs 105 and/or spatial budgets 111, and/or performing related functions alone or in combination with the mapping platform 119. In one instance, the system 100 can also access data or information related to the objects 101 (e.g., their locations, 3D models, etc.) stored in or accessible via a geographic database 125.

In one embodiment, the sensor data 115 can be processed to determine the object spatial cost 105 for a given object 101. The object spatial cost 105 can be any data, parameter, or metric that represents or is otherwise based on the spatial volume of the object 101. For example, the object spatial cost 105 can be based on the physical volume of the object 101. In addition or alternatively, the object spatial cost 105 can be based on a geometrical cost 127 of the object 101. The geometrical cost 127, for instance, is based on the shape of the object 101 and whether that shape would block any additional volume from being used for other objects 101. For example, a cube-shaped object and a pyramidal-shaped object with the same base dimensions and height may have different spatial volumes but would have the same geometrical cost 127 because no other object can be placed in the space around the tip of the pyramid. Thus, that space would not be available for use in placing other objects and would be counted as an additional geometrical cost 127 of the pyramidal object.

In one embodiment, the system 100 may also consider other cost data 129 to compute the object spatial cost 105 for a given object 101. Examples of other cost data 129 include but are not limited to:

Contextual costs—representing any additional volume of space that would be unusable based on placement of an object 101 (e.g., an object 101 may have a shape that would prevent stacking any other object on top of the object 101, and thus space above the object 101 would be counted as contextual cost);

Opportunity costs—representing any volume or area of a surface that would be precluded from having another object place after a given object 101 is first placed on the surface; and Visual costs—representing costs associated with a view to other objects or features being blocked by placement of an object 101 at a given location.

In one embodiment, the object spatial cost 105 for an object 101 can be computed relative to the space 103 available for storing or placing the object. The available space 103 can be represented as an available spatial budget 107 indicating the number of designated standard voxels 109

(or other equivalent cubic/volumetric units) into which the available space 103 can be subdivided. The object spatial budget 111, for instance, can then be computed as the spatial cost 105 of the object 101 divided by the available spatial budget 107 of the home or other place in which the object 101 is placed or requested to be placed.

In one embodiment, the system 100 can provide the computed object spatial cost 105, object spatial budget 111, geometrical cost 127, other cost data 129, available spatial budget 107, and/or other related data (e.g., recommendation regarding disposition of an object 101 given its spatial cost 105 and/or spatial budget 111) as an output. The output, for instance, can be provided to or otherwise accessed by other components of the system 100 such as but not limited to a services platform 131, one or more services 133a-133n (also collectively referred to as services 133) of the services platform 131, and/or one or more content providers 135. These components can then use the output to provide one or more functions or services.

Figure 2:
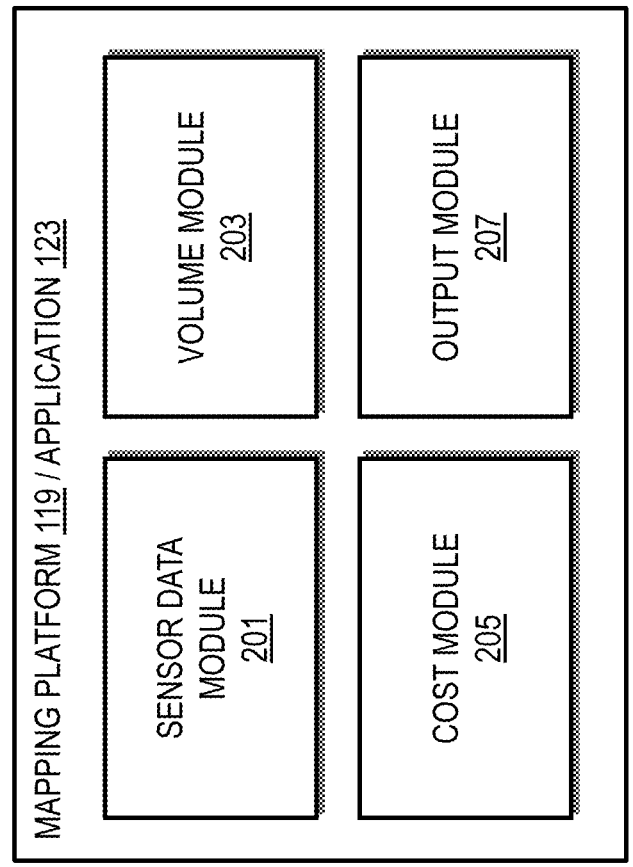
FIG. 2 is a diagram of the components of mapping platform capable of associating an object with a spatial budget, according to one example embodiment.

In one embodiment, the mapping platform 119 of the system 100 performs one or more functions for associating objects 101 with corresponding object spatial cost 105 and/or object spatial budget 111. FIG. 2 is a diagram of the components of mapping platform 119 capable of associating an object 101 with a spatial budget 111, according to one example embodiment. As shown in FIG. 2, the mapping platform 119 includes one or more components for computing object spatial cost 105 and/or object spatial budget 111 according to the various embodiments described herein. It is contemplated that the functions of the components of the mapping platform 119 may be combined or performed by other components of equivalent functionality. As shown, in one embodiment, the mapping platform 119 includes a sensor data module 201, a volume module 203, a cost module 205, and an output module 207. The functions of these components are described with respect to the figures below.

Figure 3:
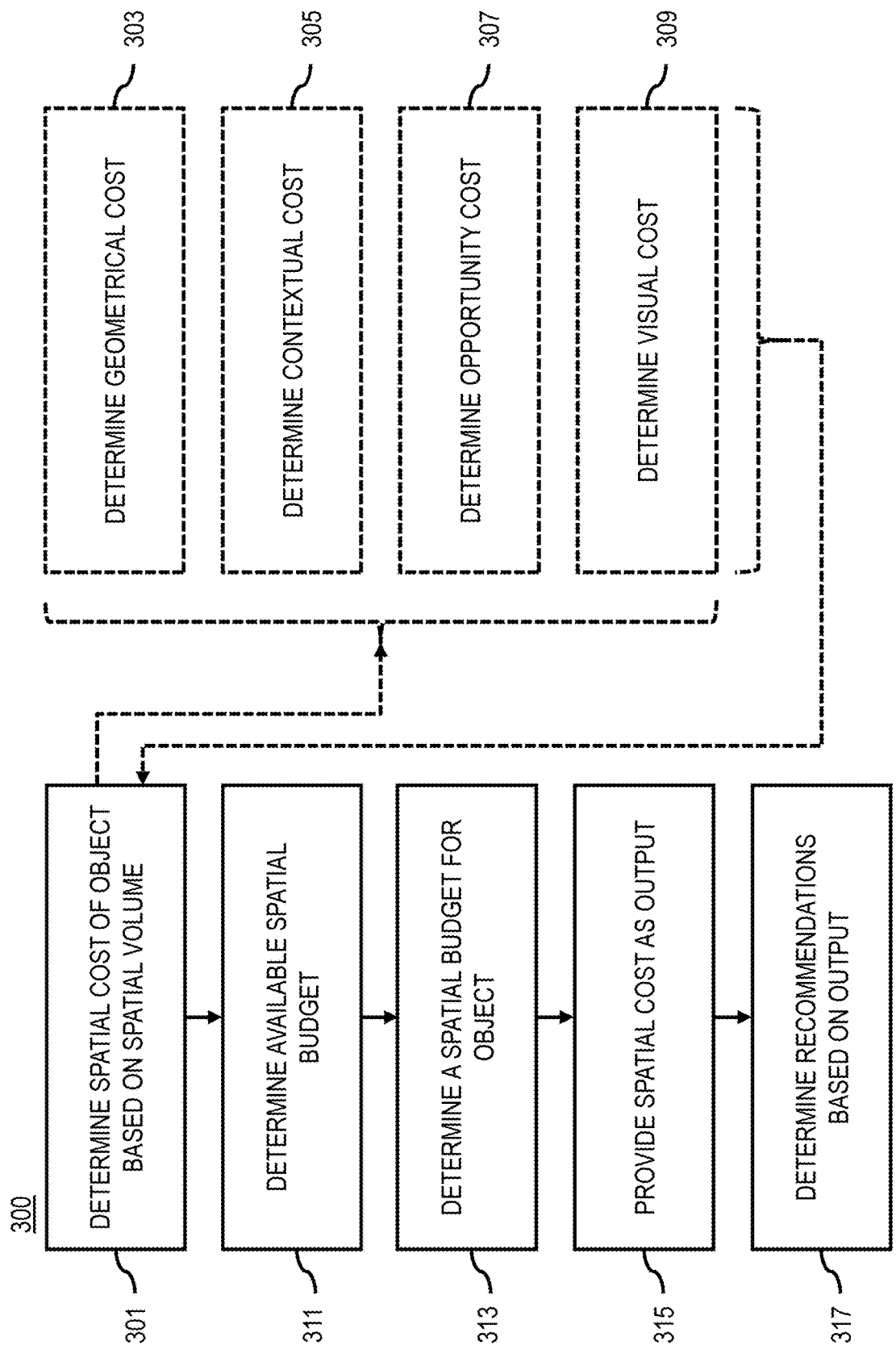
FIG. 3 is a flowchart of a process for associating an object with a spatial budget, according to one example embodiment.
Figure 11:
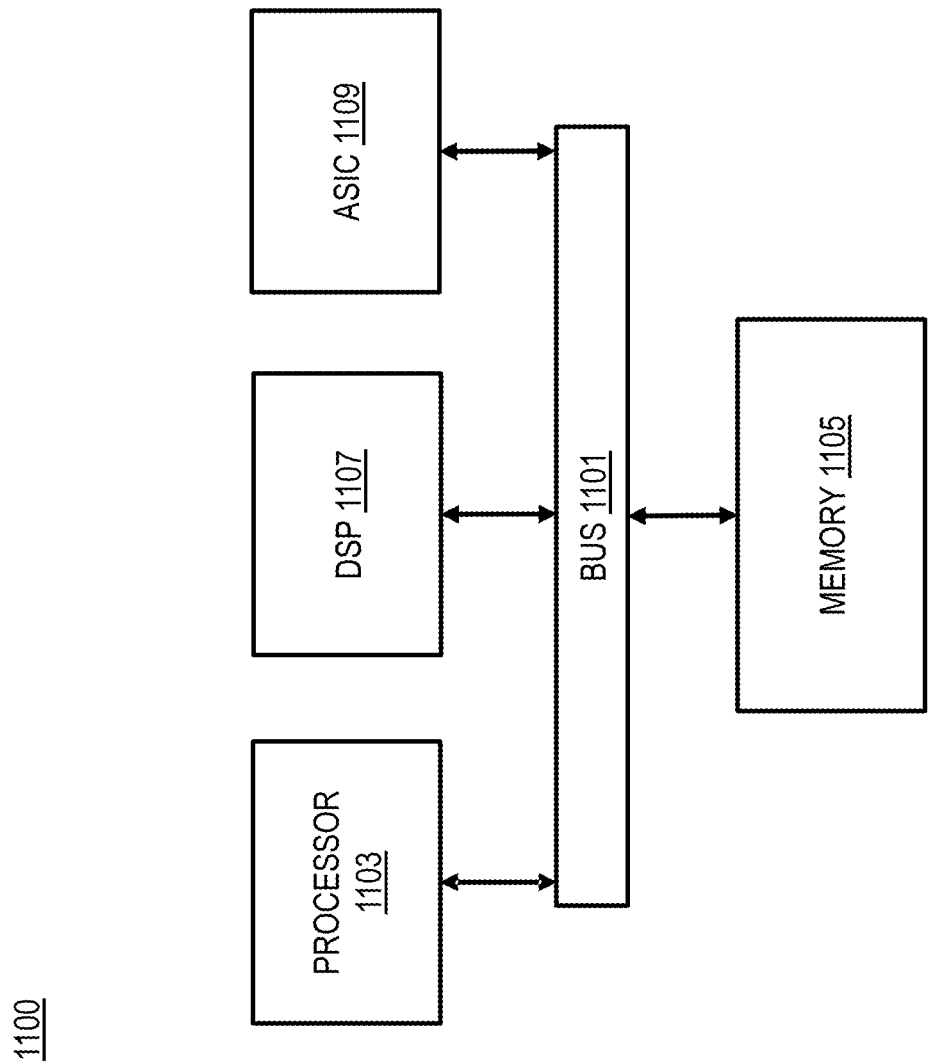
FIG. 11 is a diagram of a chip set that can be used to implement an embodiment.

FIG. 3 is a flowchart of a process for associating an object 101 with a spatial budget 111, according to one example embodiment. In various embodiments, the mapping platform 119 and/or any of its modules/components may perform one or more portions of the process 300 and may be implemented in, for instance, circuitry or a chip set including a processor and a memory as shown in FIG. 11. As such, the mapping platform 119 and/or any of its components/modules can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

At step 301, the cost module 205 determines a spatial cost 105 of an object 101 based, at least in part, on a spatial volume of the object 101. As used herein, the term "spatial volume" refers to the amount of space occupied by the object 101 (e.g., expressed in cubic/volumetric units such as but not limited to voxels 109). Thus, the spatial cost 105 can be represented as the number of cubic/volumetric units (e.g., voxels 109) occupied by the object 101. In one embodiment, the process for determining the spatial volume is based on whether the object 101 is a "dumb" versus "smart/connected" object 101. A "dumb" object 101 is a traditional object that does not have hardware/software to transmit information about itself (e.g., spatial volume, position within the available space 103, object identification/attri- butes, etc.) versus a "smart/connected" object 101 that includes such hardware/software (e.g., an Internet of Things device). For example, smart/connected objects 101 can connect to the volume module 203 (or any other component of the mapping platform 119 and/or system 100) over the communication network 121 to report their position, exact volume, and/or other object data themselves.

On the other hand, for dumb objects (or for smart/connected objects where the self-reporting function is not used), the cost module 205 interacts with the volume module 203 and sensor data module 201 to initiate a scan of the object 101 using a sensor 113 to determine its spatial volume. For example, the sensor 113 can be a LiDAR device that uses laser light to measure distances to various points in the environment (e.g., available space 103) and/or the objects 101 within the environment. A LiDAR scan is then a sweep of the LiDAR sensor device that covers a field of view of interest to generate a 3D point cloud or mesh representing the surfaces within the environment reflect the laser light. Image segmentation and/or object recognition (e.g., using a machine learning-based feature detector) can be used to segment and extract the portion of the point cloud corresponding to an object 101 of interest. The determining of the spatial volume of the object 101 is then based on the scan (e.g., computing the spatial volume from the LiDAR point cloud data of the object 101). It is noted that the example of using a LiDAR scan described above is provided by way of illustration and not as a limitation. It is contemplated that an equivalent process can be used for other sensor types including but not limited to camera sensors (e.g., where images of the environment and/or object can be processed to determine the spatial volume of the object 101 of interest). In some embodiments, the spatial volume of the object 101, dimensions from the spatial volume can be computed, and/or other attributes of the object 101 can be manually specified, e.g., via a user interface (UI) if a device (e.g., UI of an application 123 executing on the UE 117).

In one embodiment, the cost module 205 can consider additional cost factors in addition or as an alternate to the spatial volume of the object 101 when computing the object spatial cost 105. These optional cost factors include but are limited to:
  Geometrical cost;
  Contextual cost;
  Opportunity cost; and
  Visual cost.

The various embodiments for determining these optional additional cost factors are respectively described in optional steps 303-311 below.

At optional step 303, the cost module 205 determines a geometrical cost 127 of the object 101 based on a shape of the object 101. In one embodiment, the geometrical cost 127 is any additional volume that is blocked because of the shape of the object 101. For example, as described further above, a pyramid has a lower volume than a cube of the same base and height, but the pyramid takes up as much effective volume as the cube, because the "unused" volume (e.g., the difference between the spatial volumes of the pyramid and cube) cannot be used to store or place any other object 101. The difference in spatial volume between the pyramid and the cube can be computed as a geometrical cost 127 of an object 101 with a pyramidal shape.

More generally, in one embodiment, the cost module 205 can determine a geometrical cost 127 of the object 101 based on a number of one or more standard geometrical volumes/shapes (e.g., a voxel 109) occupied by the shape of the object 101. With respect to the pyramid and cube example above, the pyramid would occupy a single voxel 109 with length, width, and height equal to the base and height as the pyramid but not fill the space of the voxel fully. The difference or unused space in the voxel 109 is the geometrical cost 127 of the pyramid. In contrast, the cube would fully occupy a voxel 109 with the same length, width, and height equal to the cube. Thus, the difference or geometrical cost of a cube would effectively be zero.

In one embodiment, there might be a difference in the perception of how full a room or available space 103 is between objects 101 of different shapes (e.g., differences in perception of the pyramid and the cube). In this case, the computed difference between a given shape of an object 101 and the standard geometrical volume or shape (e.g., the geometrical cost 127) can be weighted based on the differences in perception. For example, the weight can be determined based on user preference information collected from individuals or groups of individuals, determined based on the amount of unused space associated with a shape (e.g., shapes with more unused space are weighted less with respect to making a room appear more full), and/or the like. Thus, the unused or additional volume associated with different shapes can treated differently in different context with respect to computing a geometrical cost 127 associated with the shape of the object 101.

At optional step 305, the cost module 205 determines a contextual cost (e.g., part of other cost data 129) of the object 101 based on one or more additional volumes of the available space 103 that would be rendered unavailable to another object by the storage or the placement of the object 101. The spatial cost 105 of the object is further based on the contextual cost. In other words, the contextual cost is any additional volume that the object 101 would render unusable in a specific surrounding, e.g., relative to a concrete location in the available space 103 (e.g., a home, apartment, place, etc.). In one embodiment, the term "unusable" refers to any additional volume (e.g., in proximity to the placement/storage location of object 101) where the object 101 would prevent any other object 101 from being placed or stored. For example, it may be impractical or difficult to put another object 101 on top of a pyramid or similar shapes which may require precarious balancing of other objects 101 on top or where the stacked objects 101 may be unstable. In that case, the additionally lost volume in a room or available space 103 is the distance between the tip of the pyramid and the ceiling. In yet other cases, stacking or placing objects on top, below, adjacent, etc. may be incompatible based on the nature of the objects (e.g., stacking objects on a lamp may block light from the lamp or be subject to lamp's heat, placing objects in a way that can block vents or other input/output areas of other objects, etc.). Thus the contextual cost can be based on the types of objects 101 and their limitations with respect to blocking placement of other objects adjacent or near the object 101.

FIG. 4A is a diagram illustrating an example of contextual cost, according to one example embodiment. In this example, an available space 103 is shown from a side view with the top of the diagram representing the ceiling and the bottom the floor. Each block or grid cell in the diagram represents a cross section of a voxel dividing the available space 103. A pyramidal object 401 is placed at location 403 on the floor, and a contextual cost is computed for the pyramidal object 401 based on whether other objects can be stacked on top. In this case, because of the object 401's pyramidal shape, no other object can be stacked on top because they would simply fall off. Accordingly the contextual cost 405 would extend beyond the voxel containing the object 401 at location 403 up the ceiling to encompass three additional voxels (e.g., indicated by a bolded boundary around the total spatial cost of the object 401).

In one embodiment, additional other cost data 129 can be computed if several objects 101 are considered together.

For example, at optional step 307, the cost module 205 determines an opportunity cost of the object based on an area of a plane surface that would be rendered unavailable to another object by the storage or the placement of the object. The spatial cost 105 of the object is further based on the opportunity cost. FIG. 4B is a diagram illustrating an example of an opportunity cost, according to one example embodiment. In the example of FIG. 4B, consider a plane surface 421 of 100×100 cm, a first object 423 measuring 30×30 cm and a second object 425 measuring 80×80 cm. By putting the 30×30 object 423 on the plane surface 421 (e.g., a table surface), the area becomes unavailable for the 80×80 object 425. Accordingly, placing the first object 423 on the plane surface 421 may require relocating the second object 425 to another plane surface of at least 80×80 area because there would not be enough space for both objects 423 and 425 to be placed on the plane surface 421 at the same time (e.g., indicated by overlap 427). If there is no other area or plane surface is available for either of the objects, this results an opportunity cost of the 30×30 cm that goes beyond any of the costs associated only with the objects itself as listed above.

Figure 4C:
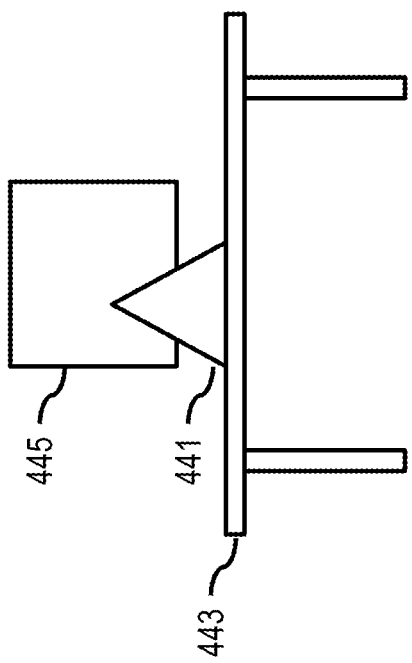

At optional step 309, the cost module 205 determines a visual cost of the object based on determining that the storage or the placement of the object blocks a line-of-sight view to another object. The spatial cost 105 of the object is further based on the visual cost. For example, as shown in the example of FIG. 4C, the placement or storage of an object 441 at certain locations in the available space 103 (e.g., on a table 443) might be blocking the view on another objects 445 (e.g., a frame with family pictures, a window, etc.). In one embodiment, the cost module 205 can perform line of sight computations within the corresponding available space 103 to reveal such "visual costs." The line of sight computations can be computed from one or more selected locations within the available space 103 (e.g., from known seating locations, designated viewing locations, a central location, etc.). The visual cost can also be based on the percentage of the other object (e.g., object 445) visually blocked by the placed object or object of interest (e.g., object 441). In one embodiment, the visual cost can be applied as a weighting factor to the associated voxel or volumetric unit associate with the blocked line of sight.

In one embodiment, after determining one of more of the cost factors discussed with respect to the various embodiments described above, the cost module 205 computes the spatial cost 105 of an object from an aggregation of one or more selected cost factors (e.g., spatial volume, geometrical cost, contextual cost, opportunity cost, visual cost, and/or the like). The object spatial cost 105, for instance, can include aggregation all of the volumes (e.g., voxels 109 and/or any other equivalent volumetric unit) associated with the cost factors determined for the object 101.

Figure 5:
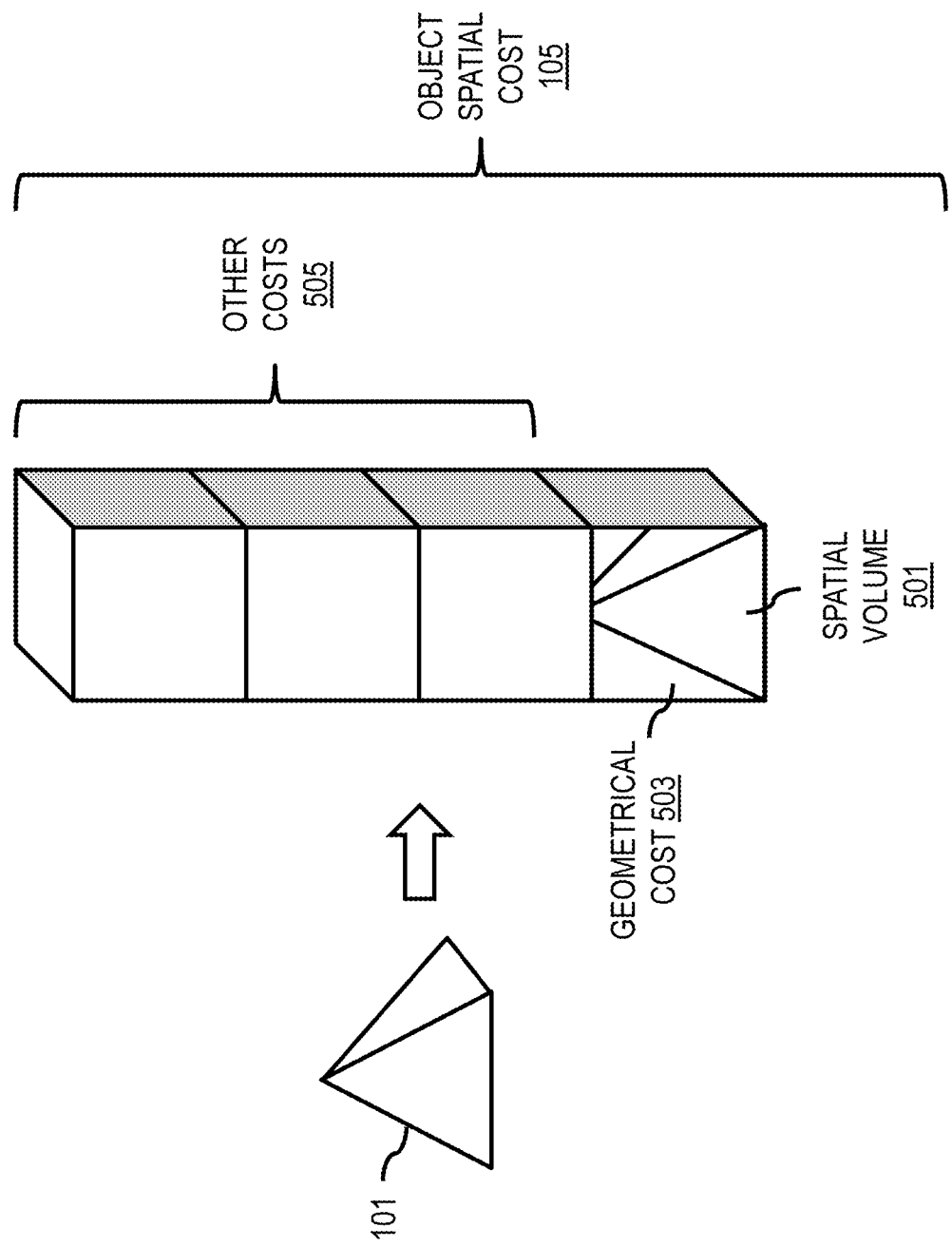
FIG. 5 is a diagram illustrating an example representation of a spatial cost of an object, according to one example embodiment.

FIG. 5 is a diagram illustrating an example representation of an object spatial cost 105, according to one example embodiment. In the example of FIG. 5, an object 101 is selected for computation of a corresponding object spatial cost 105. To perform the computation, the cost module 205 determines the spatial or net volume 501 of the object 101. The cost module 205 also determines the geometrical cost 503 and/or other selected costs 505 (e.g., contextual cost, opportunity cost, and/or visual cost) according to the various embodiments described herein. The object spatial cost 105 is then represented as the aggregation of the spatial volume 501, geometrical cost 503, and other costs 505.

In one embodiment, the cost module 205 can further represent the object spatial cost 105 as an object spatial budget 111. For example, at step 311, the cost module 205 determines the available spatial budget 107 for the available space 103 in which an object 101 is placed/stored or requested to be placed/stored. To determine the available spatial budget 107, the volume module 203 partitions the available space into one or more voxels 109 (or other equivalent volumetric unit). In this way, the available spatial budget 107, the spatial budget 111 of the object 101, the spatial cost of the object 101, or a combination thereof can be represented based on the one or more voxels 109 or equivalent volumetric units. In one embodiment, the available spatial budget 107 is also referred to as the raw spatial budget. The available spatial budget 107 or raw spatial budget is equivalent to the volume of the available space 103 for placing one or more objects (e.g., space associated with a house, and/or any other place). By way of example, the raw spatial budget can be calculated according to the following or equivalent:

$$\text{available spatial budget } 107 = \text{area} \times \text{height} - \text{slopes}$$

where area is the area of the available space 103, height is the height of the available space 103, and slopes is the volume in the available space 103 corresponding to sloped walls or surfaces.

In one embodiment, the volume module 203 also computes the used spatial budget (e.g., object spatial budget 111) representing the volume in the available space 103 taken by objects 101, e.g., considering their net spatial value and/or other spatial cost factors (e.g., geometrical costs, contextual costs, etc.).

One example equation for computing the object spatial budget 111 (e.g. used spatial budget) includes but is not limited to:

$$\text{Object Spatial Budget } 111 = \left( \frac{\text{Object Spatial Cost } 105}{\text{Available Spatial Budget } 107} \right)$$

Figure 6A:
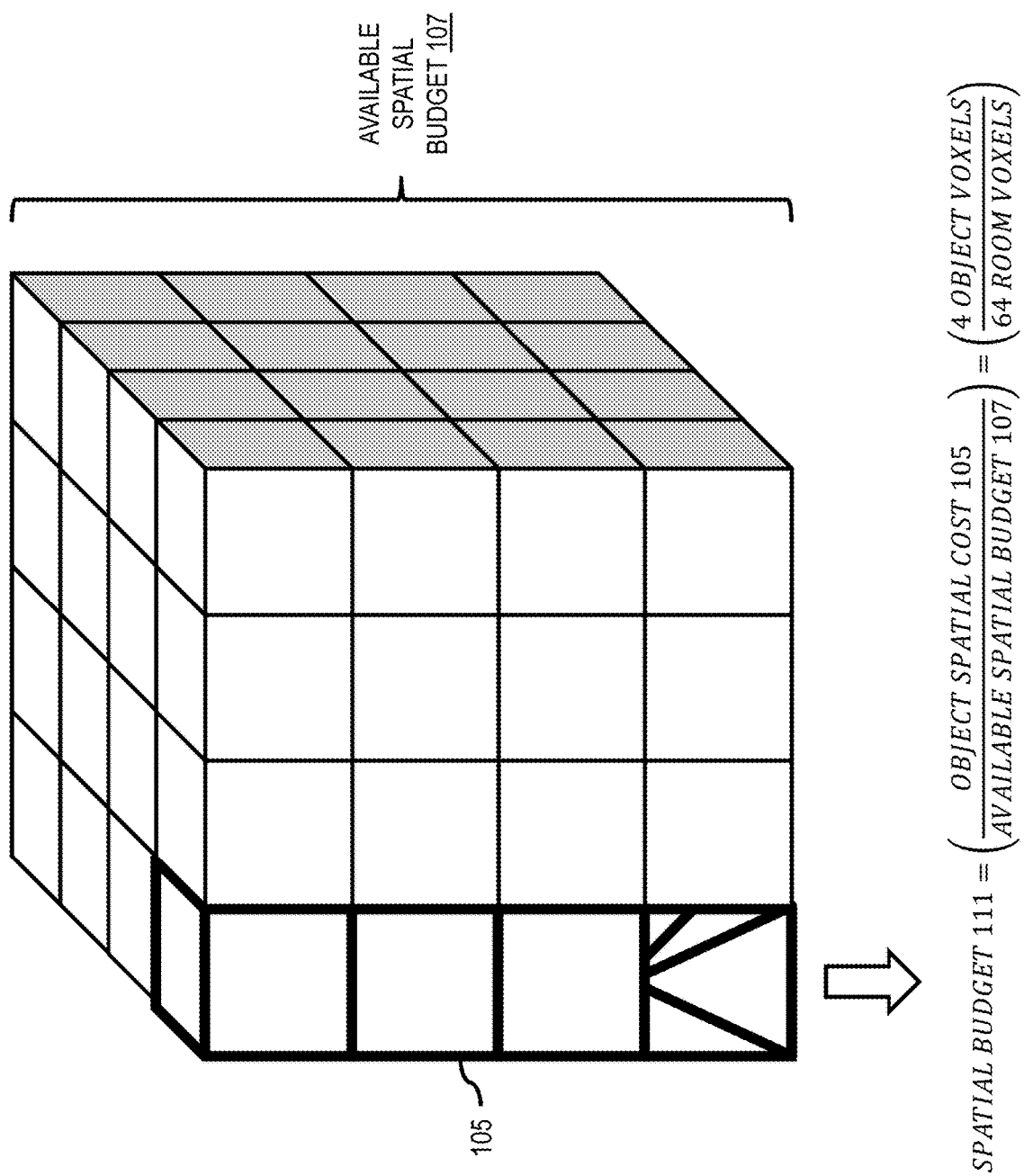
FIGS. 6A-6D are diagrams illustrating example factors for computing a spatial budget of an object, according to various example embodiments.

FIG. 6A illustrates an example of computing an object spatial budget 111, according to one example embodiment. In this example, the object spatial cost 105 is computed as 4 object voxels and the available spatial budget 107 is computed as 64 room voxels. The object spatial budget 111 is then computed as follows:

$$\text{Object Spatial Budget } 111 =$$

$$\left( \frac{\text{Object Spatial Cost } 105}{\text{Available Spatial Budget } 107} \right) = \left( \frac{4 \text{ Voxels}}{64 \text{ Voxels}} \right)$$

In one embodiment, the volume module 203 is configured to account for blocked volumes (e.g., blocked voxels) in the available space 103. In other words, some parts of the available space 103 may not be available for object placement or storage, e.g., areas in front of doors or windows. These volumes can be subtracted from the available spatial budget 107 (e.g., raw spatial budget) similar to the used spatial budget in order to arrive at the truly available budget.

$$\text{Object Spatial Budget } 111 =$$

$$\left( \frac{\text{Object Spatial Cost } 105}{\text{Available Spatial Budget } 107 - \text{Blocked Volumes } 621} \right)$$

Figure 6B:
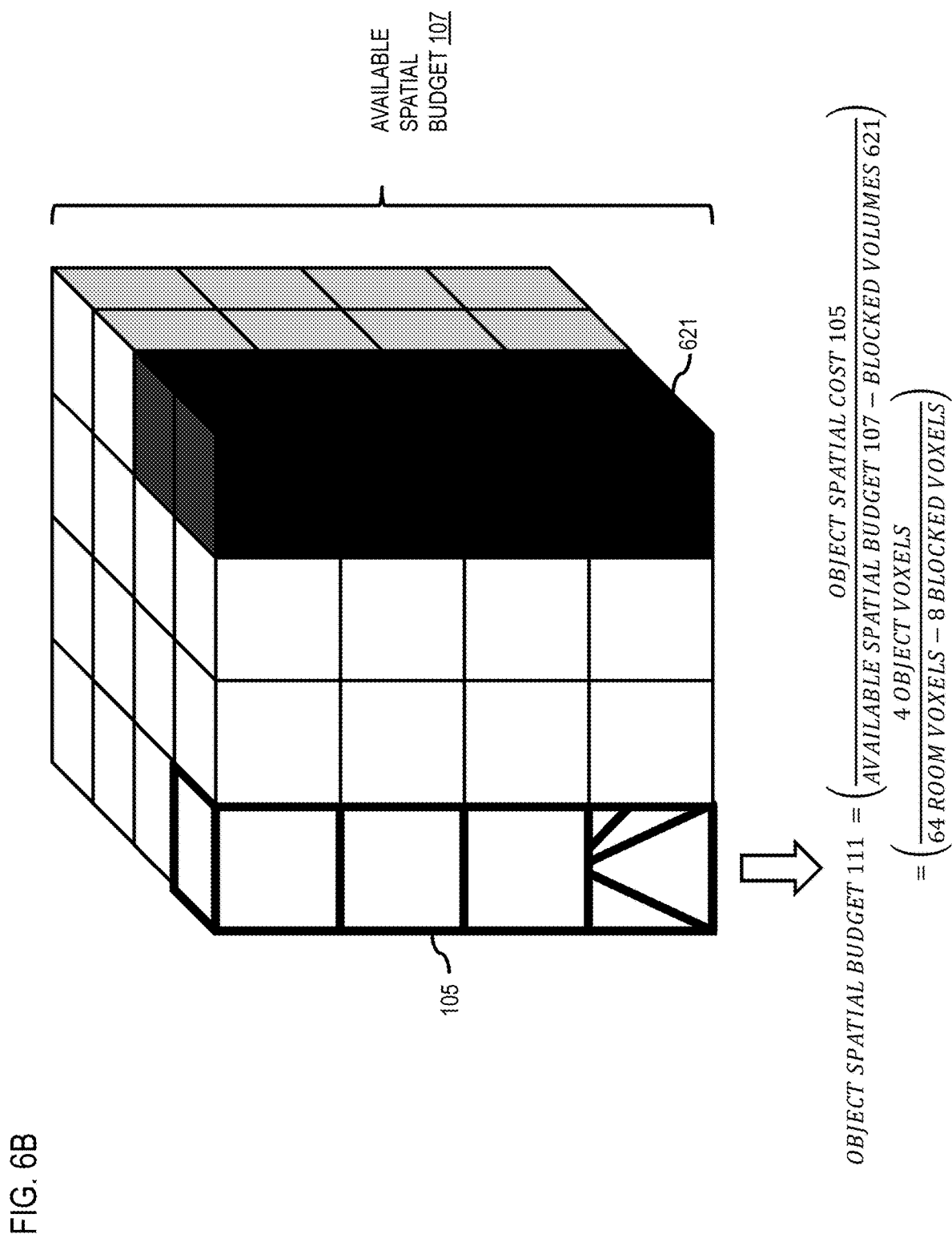

FIG. 6B illustrates an example of computing an object spatial budget 111 with blocked volumes 621, according to one example embodiment. In this example, the object spatial cost 105 is computed as 4 object voxels, the available spatial budget 107 is computed as 64 room voxels, and the blocked volumes 621 is computed as 8 voxels (e.g., volume in front of a door that is unavailable for object placement/storage to avoid blocking the door). The object spatial budget 111 is then computed as follows:

$$\text{Object Spatial Budget } 111 =$$

$$\left( \frac{\text{Object Spatial Cost } 105}{\text{Available Spatial Budget } 107 - \text{Blocked Volumes } 621} \right) =$$

$$\left( \frac{4 \text{ Voxels}}{64 \text{ Voxels} - 8 \text{ Blocked Voxels}} \right)$$

In one embodiment, besides fully blocking particular units of space as forbidden (e.g., as described above, different voxels 109 or volumetric units might have a different value with respect to their effect on the object spatial cost 105 and/or object spatial budget 111, and this assignment of voxel to value might even differ per person, per object 101, available space 103, place, environment, and/or other equivalent contextual factor. To address this potential, in one embodiment, the cost module 205 can apply a different unit to measure the cost of an object 101, where instead of the volume consumed, the cost is the aggregated utility of all voxels consumed (utility cost or metric). Accordingly, the cost module 205 can compute a utility metric or cost respectively for the one or more voxels (or other volumetric units) based on a utility function. The spatial cost of the object is further based on the utility metric.

In one embodiment, the utility of a voxel or volumetric unit can also be dependent on other voxels. For example, a voxel that is in the middle of an available space 103 (e.g., in the middle of the air) may have low utility because there is no easy way to place an object in the voxel unless a support mechanism (e.g., a table, shelf, etc.) is placed in nearby voxels to provide support. For example, the voxel to have a higher level of utility, it may need to voxels below it to be occupied (e.g., to allow stacking or placement of objects 101). Thus, the utility of voxels within the available space 103 can be dynamically recomputed as voxels with available space 103 are occupied.

Figure 6C:
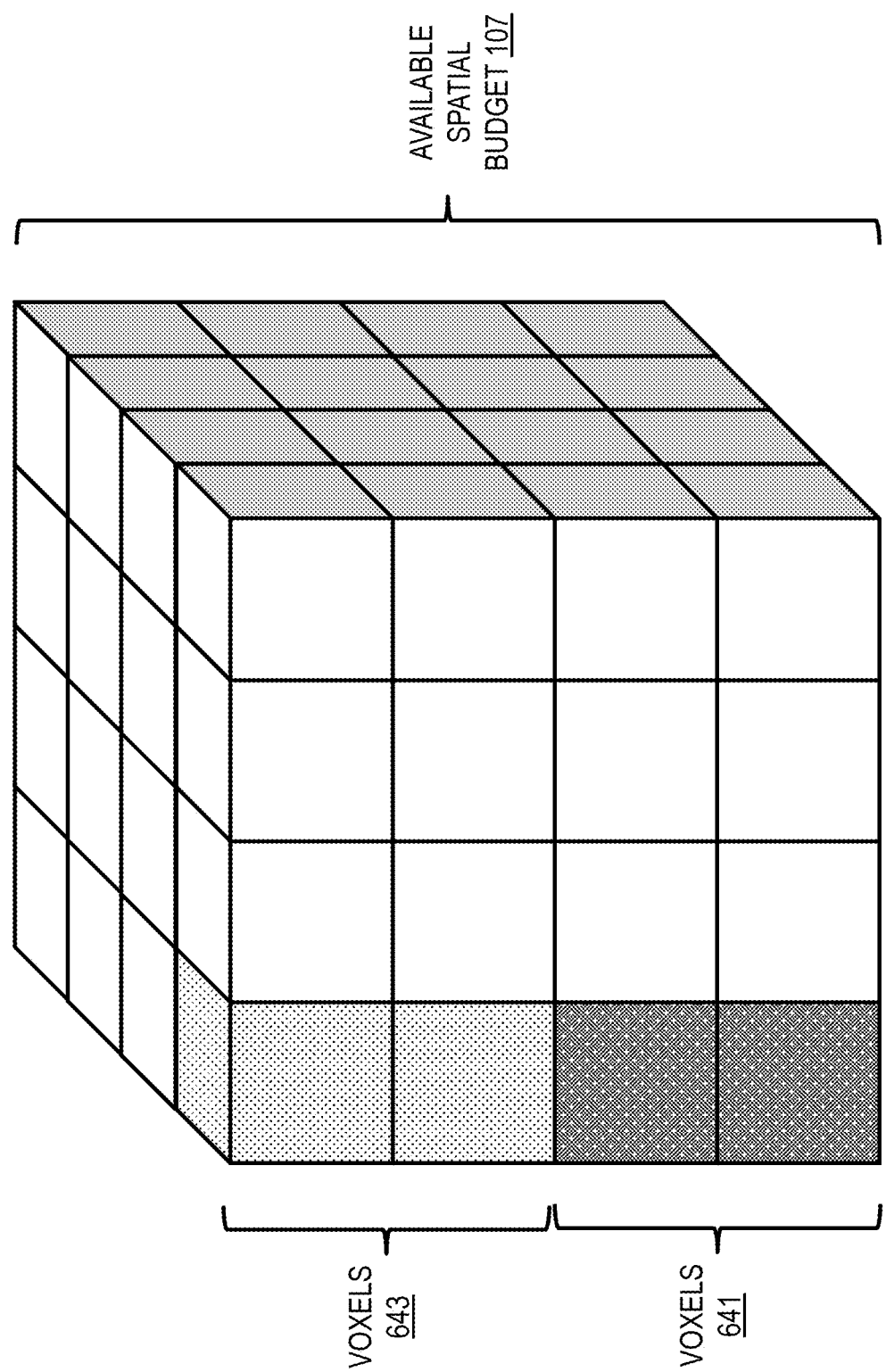

FIG. 6C is a diagram illustrating an example of assigning different utility metrics or costs to different voxels or volumetric units, according to one example embodiment. In this example, the available spatial budget 107 is partitioned into 64 voxels. Voxels 641 are assigned a high utility value and are indicated with dark shading, voxels 643 are assigned a medium utility value and are indicated with medium shading, and the remaining voxels have low utility value and are not shaded. Objects 101 that occupy voxels 641 would inherit higher spatial costs (e.g., have higher weights apply to boost spatial costs) relative to objects 101 that occupy voxels 643 which would inherit medium weighted spatial costs. Similarly, the objects 101 that occupy to other voxels with low utility will have the least amount of utility weighting. For example, voxels 641 may correspond to an area of the available space that is the user's favorite or most frequently used location, that corresponds to a position with the best view outside of the space, etc.

Figure 6D:
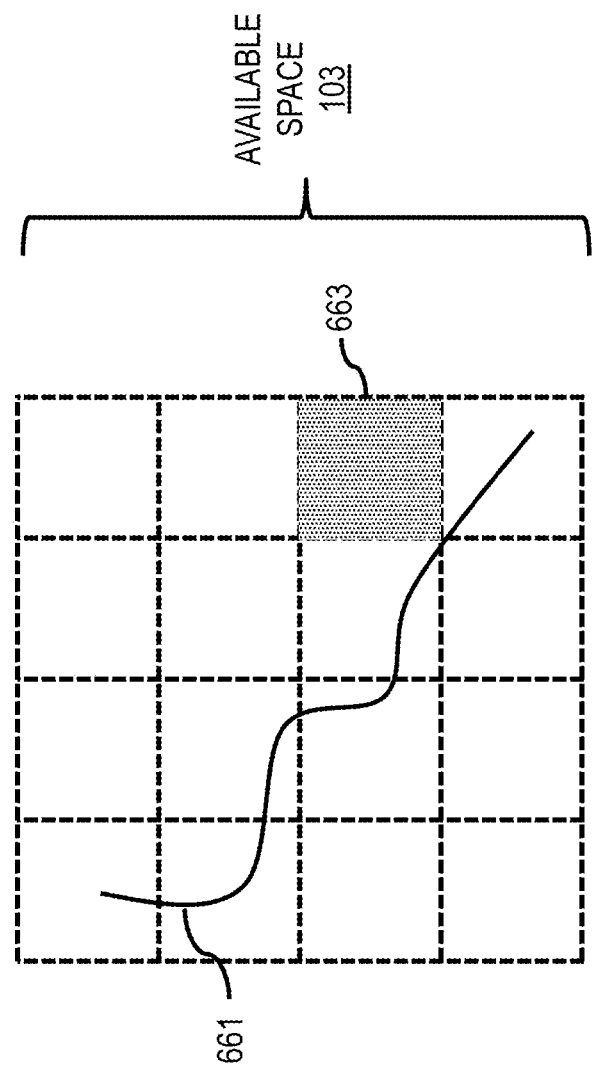

In one embodiment, the utility metric or utility function can be based on user specified preferences, usage history of the space, room features (e.g., windows, lights, amenities, etc.) present in the available space 103, and/or the like). For example, the utility metric or cost can be based on a user's mobility graph indicating the most frequently used or traveled locations within the available space 103. For example, to generate the mobility graph, the cost module 205 interacts with the sensor data module 201 to retrieve probe data collected from one or more devices moving within the available space 103. For example, the sensor data module 201 can map between locations in the available space 103 and people using probe data collected by UEs 117 traveling in the area. In one instance, the system 100 can also track users in the available space 103 using beacons, Wi-Fi, geotagging of pictures, etc. In one instance, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time. In the context of an indoor space, the system 100 can use, e.g., radio scanning with media access control (MAC) address of wireless access points (e.g., WiFi, etc.) and/or beacons (e.g., Bluetooth, near field communications, etc.) and corresponding signal strengths, which in turn, can be resolved into latitude, longitude instead of relying satellite-based positioning which may not be available indoors. The sensor data module 201 then processes the probe data to determine a mobility graph of the one or more devices. The mobility graph, for instance, indicates the locations, paths, etc. of the user within the available space 103. FIG. 6D is a diagram illustrating an example mobility graph tracing the path 661 that is most traveled within the available space 103 (e.g., partitioned into voxels). The diagram of FIG. 6D also indicates the voxel 663 in which there are the most number of stops by users. In one embodiment, the utility metric is determined based on the mobility graph. For example, voxels through the path 661 passes can be assigned higher utility metrics/costs. Voxel 663 with the most number of stops (e.g., rest areas) can also be assigned a higher utility value. In other words, the cost module 205 can use the mobility graph (e.g., historical mobility patterns) to learn the most walked paths and most used rest areas in order to give them special values/attributes.

In one embodiment, the cost module 205 can also value the presence of plane surfaces (e.g., horizontal and/or vertical surfaces) more highly that other feature because they constitute a valued part of the "real estate" in typical environments. For example, consumer generally store or place objects almost exclusively on plane or flat surfaces. Accordingly, the sensor data module 201 can detect and record the presence of plane surfaces within the available space 103. In one embodiment, the sensor data module 101 can use sensors 113 to scan the available space 103 for plane or flat surfaces. One example of a sensor 113 includes but is not limited to a LiDAR sensor, camera sensor, and/or the like. LiDAR, for instance, can be used to scan the entire available space 103 to generate point cloud data. The point cloud data is then processed (e.g., using machine learning-based image recognition and segmentation) to identify plane surfaces.

Figure 7:
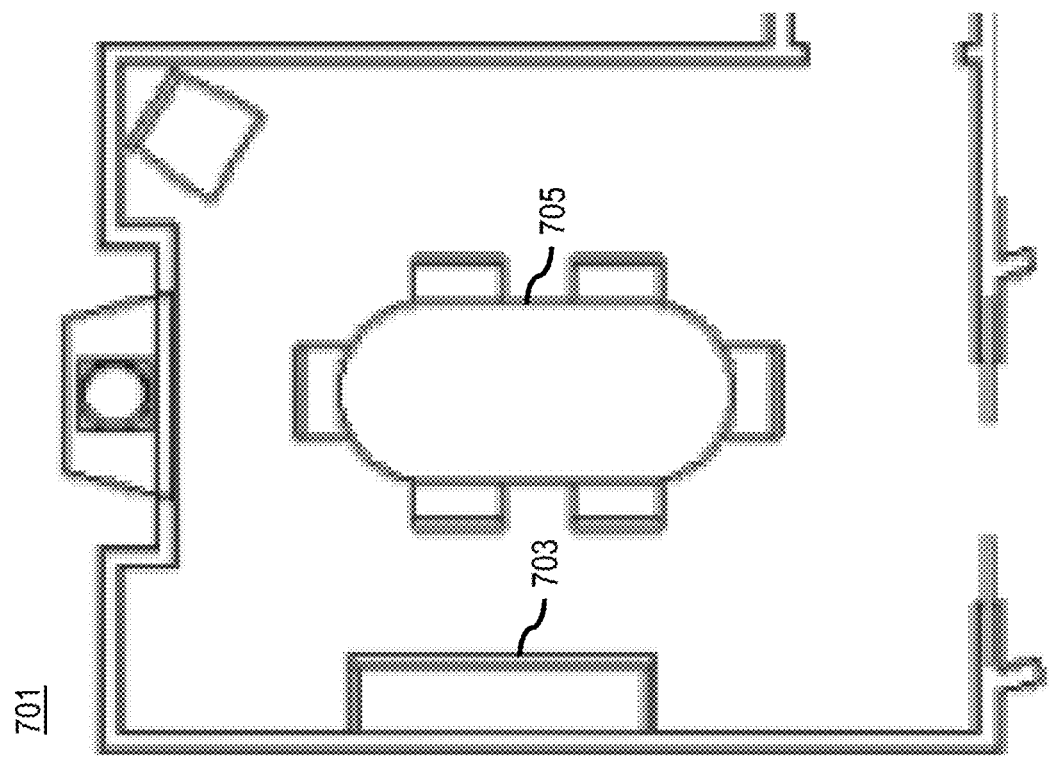
FIG. 7 is a diagram illustrating example plane surfaces for object placement, according to one example embodiment.

FIG. 7 is a diagram illustrating example plane surfaces for object placement, according to one example embodiment. In the example of FIG. 7, a room 701 is scanned using a sensor 113 (e.g., LiDAR sensor). The resulting sensor data 115 is processed to identify plane surfaces in the room 701. As shown, a plane surface 703 (e.g., corresponding to the top surface of a side table) and a plane surface 705 (e.g., corresponding to the top surface of a conference table 705) are identified and mapped. In one embodiment, the volumes (e.g., voxels 109 and/or other volumetric units) corresponding to plane surfaces 703 and 705 can be assigned a higher utility metric.

In one embodiment, the cost module 305 determines a financial cost for the object 101 of interest based on the object spatial budget 111 and a real estate cost for the available space. For example, once an object's spatial cost 105 and the available spatial budget 107 are computed, the cost module 205 can express the spatial cost relative to the budget (e.g., the object spatial budget 111), e.g., expressed as "this object will consume 12% of your remaining spatial budget." This object spatial budget 111 can be linked to an actual financial cost. In one embodiment, the financial cost can be computed as follows:

$$\text{Financial Cost} = \text{Object Spatial Budget 111} \times \text{Real Estate Cost}$$

wherein the real estate cost is for the available space 103 in which the corresponding object 101 is placed. In other words, the financial cost is determined based on the relative cost of the object (overall spatial cost)/(raw spatial budget) and multiply this with the associated real estate cost (e.g., purchase price, monthly rent, assessed value, etc.).

In one embodiment, if the cost module 205 uses different utility metrics or costs per voxel, the relative cost can be computed as (utility cost of object 101)/(sum of utility of all voxels).

At step 315, the output module 207 provides the spatial budget 111 of the object 101, the spatial cost 105 of the object 101, the available spatial budget 107, or a combination thereof as an output. In one embodiment, the output can be provided to one or more component of the system 100 (e.g., services platform 131, services 133, and/or content providers 135) or components with connectivity to the system 100. It is contemplated that the output can be used by the mapping platform 119 and/or any other components to provide one or more services and/or applications.

For example, at step 317, the output module 207 determines recommendations for the object 101 based on the output. In one embodiment, the output module 207 can determine determining a recommended position to place or store the object in the available space based on the spatial budget of the object. More specifically, the output module 207 can determine whether the spatial budget 111 and/or spatial cost 105 of an object 101 permits it to be placed within the available space 103. In addition, the output module 207 can search the available space 103 for unused portions of the available space 103 in which the object 101 can be placed given its spatial budget 111 and/or cost 105. The output module 207 can take into account user preferences, spatial cost factors discussed with respect to the various embodiments described herein, properties of the object 101, properties of the available space 103, and/or the like to recommend a location for placing or storing the object.

In one embodiment, the output module 207 can also link purchases to the available spatial budget 107 or otherwise compute an object spatial budget 111 and/or cost 105 for purchases or perspective purchases. In other words, the mapping platform 119 can initiate the determining of the spatial cost 105 and/or spatial budget 111 of an object 101 based on an acquisition/purchase or a request to acquire/purchase the object 101.

By way of example, the output module 207 can provide different ways of linking the objects 101 to a spatial budget such as but not limited to:

(1) In one scenario, the user starts with no prior data and makes a full LiDAR scan (or any other type of scan using sensor 113) on her/his indoor environment in order to create a list of all items/objects 101 and their associated spatial costs 105 and/or spatial budgets 111 along with their associated locations.

(2) In another scenario, the user has an empty space and links every purchase of objects 101 made in a shop to the location where this item will be stored or placed in the available space 103, either:

Manually, by placing an object at its location in the available space 103; or

Automatically, by simply wearing a Head Mounted Devices (HMD) like smart glasses, which would automatically be informed about a new purchase made by this user (e.g., link to bank/credit card application programming interface (API)) and would attempt to determine its new location inside the user's available space 103 (e.g., home) once the user unpacks the objects 101.

Figure 8:
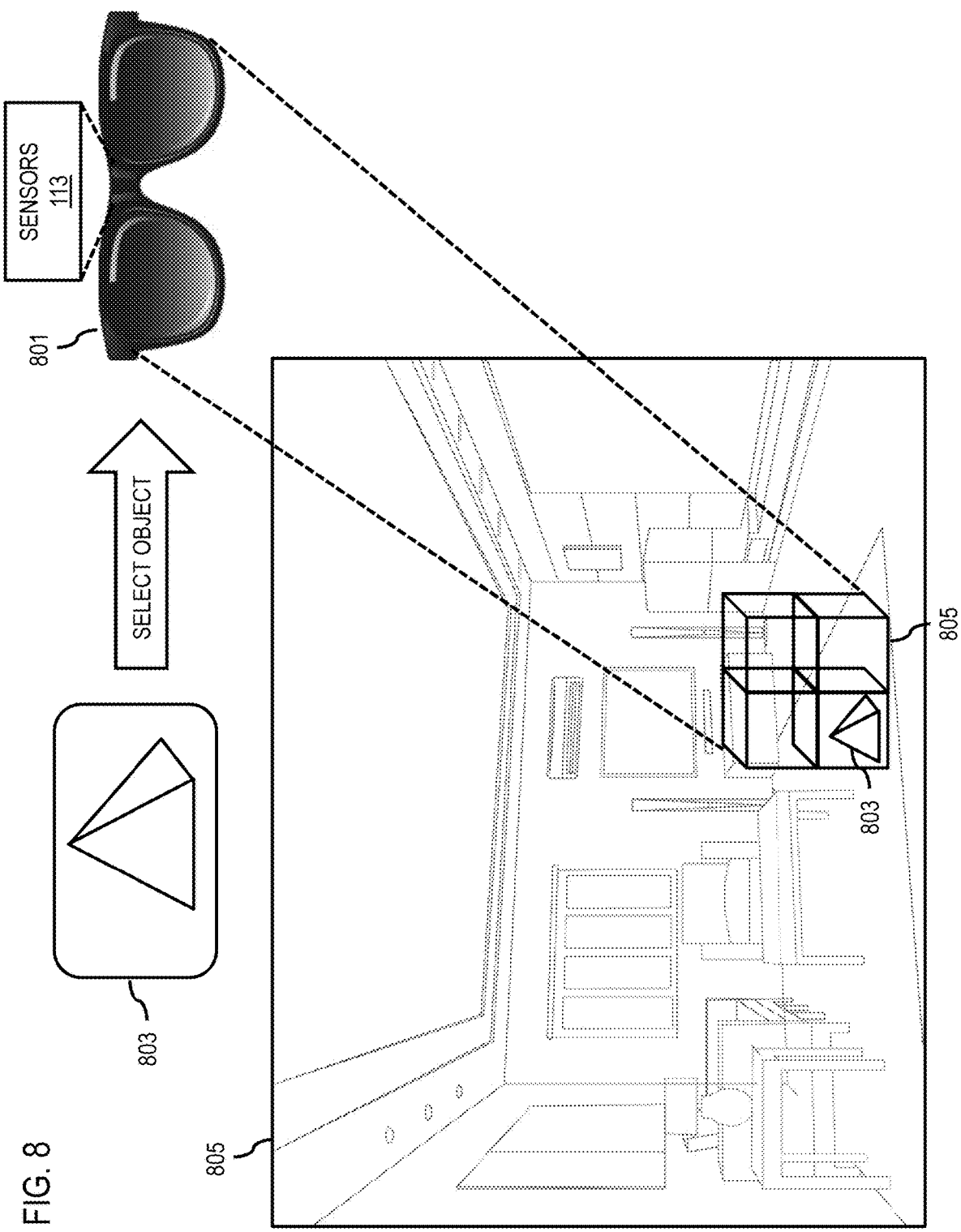
FIG. 8 is a diagram illustrating an example user interface for presenting object spatial cost data, according to one example embodiment.

In one embodiment, as shown the example of FIG. 8, the output module 207 presents the output of the system 100 in a user interface (UI) of an augmented reality (AR) device or glasses 801 (e.g., smart glasses). In this example, the glasses 801 include sensors 113 such as a front facing camera and LiDAR. Accordingly, the various embodiments of processes described herein can be automated by leveraging regular automatic scanning of the environment, change detection, and object recognitions. For example, the glasses 801 can scan for a newly acquired object 803 and then automatically select the object 803 to compute a corresponding spatial cost 105 and/or spatial budget 111 for a room 805 visible through the glasses 801. A representation of the object 803 and the spatial cost 805 of the object 803 can be presented in the AR UI of the glasses 801.

In summary, in one embodiment, the mapping platform 119 uses inputs such as but not limited to:

2D and 3D Map of the available space 103 (e.g., of a house, flat, and/or any other place) (e.g., queried from the geographic database 125);

Sensor data 115 of the available space 103 (e.g., a LiDAR or camera scan of the house or place of interest);

List of all objects 101/goods in the available space 103;

List of areas that are not available for placing/storing objects in the available space 103, e.g., paths to circulate, walk in the house, doorways, etc.;

Optionally, a list of high-value and low-value areas (e.g., utility metrics/costs) to assign non-equally distributed utility;

Probe data indicating human movement in the available space 103 of the place/environment of interest.

Based on one or more of the above inputs, the mapping uses the various embodiments described herein to provide outputs such as but not limited to:

Total volume and available spatial budget 107 for a given space (e.g., a house, flat, etc.);

Volume and associated costs of an object (e.g., object spatial costs 105); and

Impact of an object on a spatial budget (e.g., object spatial budget 111).

In one embodiment, as previously described, the mapping platform 119 can provide Contextual suggestions and recommendations at purchase or acquisition time for one or more objects 101. For example, when considering a purchase or acquisition, the mapping platform 119 complements the financial cost of the object 101 with the impact on a user's spatial budget (e.g., object spatial cost 105 and/or object spatial budget 111).

In one scenario, at purchase time, the mapping platform 101 determines and presents to the user (e.g., via a user interface of UE 117) a suggested area or plane surface in the available space 103 where such an object 101 would fit. If there is no such a space available in the user's space (or even if there is), the mapping platform 119 can suggest another object 101 that could be swapped against this "about-to-be-purchased item" that would have less object spatial cost 105 and/or object spatial budget 111 in the user's available space 103.

With such information, the user could make a decision such as but not limited to:

Not to buy the object, the user was considering;

Buy the suggested object 101 in addition to the previously evaluated item; and/or Swap the prospective object 101 of interest against an older already owned item (which could be automatically uploaded to an auction website, online marketplace, and/or the like)

In various embodiments, the mapping platform 119 can use any type of user interface for surfacing the information computed according to the various embodiments described herein. For example, as previously discussed and described with respect to FIG. 8, one user interface can leverage AR and show an overlay on top of every object 101 in the available space 103 (e.g., house, flat, etc.) with its associated spatial cost 105 and/or spatial budget 111.

Another interface would present the available space 103 (e.g., room) in a smartphone/screen interface (e.g., of an application 123 executing on the UE 117), showing every object 101 on this map with the associated spatial costs 105 and/or spatial budgets 111.

In addition or alternatively, the output module 207 of the mapping platform 119 can present the objects 101 in an available space 103 in a ranked list, to quickly visualize which objects 101 have the highest associated spatial costs 105 and/or spatial budgets 111.

Returning to FIG. 1, as shown, the system 100 includes the mapping platform 119 for associating an object 101 with a spatial budget. In one embodiment, the mapping platform 119 has connectivity over the communication network 121 to services platform 131 that provides one or more services 133 that can use the object spatial cost 105, object spatial budget 111, available spatial budget 107, and related information for downstream functions. By way of example, the services 133 may be third party services and include but is not limited to object tracking services, online shopping/marketplace services, mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 133 uses the output of the mapping platform 119 to provide services such as navigation, mapping, other location-based services, etc. to the UEs 117, applications 123, and/or other client devices/applications.

In one embodiment, the mapping platform 119 may be a platform with multiple interconnected components. The mapping platform 119 may include multiple servers, intelligent networking devices, computing devices, components, circuitry, and corresponding software for associating an object 101 with a spatial budget according to the various embodiments described herein. In addition, it is noted that the mapping platform 119 may be a separate entity of the system 100, a part of one or more services 133, a part of the services platform 131, or included within components of the UEs 117.

In one embodiment, content providers 135 may provide content or data (e.g., including sensor data 115 such as LiDAR data, image data, probe data, related geographic data, object specification data such as object spatial volume data, etc.) to the geographic database 125, the mapping platform 119, the services platform 131, the services 133, the UEs 117, and/or the applications 123 executing on the UEs 117. The content provided may be any type of content, such as sensor data, imagery, probe data, machine learning models, permutations matrices, map embeddings, map content, textual content, audio content, video content, image content, etc. In one embodiment, the content providers 135 may provide content that may aid in associating an object 101 with a spatial budget according to the various embodiments described herein. In one embodiment, the content providers 135 may also store content associated with the geographic database 125, mapping platform 119, services platform 131, services 133, and/or any other component of the system 100. In another embodiment, the content providers 135 may manage access to a central repository of data, and offer a consistent, standard interface to data, such as a repository of the geographic database 125.

In one embodiment, the 117 may execute software applications 123 to use output of the mapping platform 119 or other data derived therefrom according to the embodiments described herein. By way of example, the applications 123 may also be any type of application that is executable on the UEs 117, such as object cataloging/tracking applications, routing applications, mapping applications, location-based service applications, navigation applications, device control applications, content provisioning services, camera/imaging application, media player applications, social networking applications, calendar applications, and the like. In one embodiment, the applications 123 may act as a client for the mapping platform 119 and perform one or more functions for associating an object 101 with a spatial budget alone or in combination with the mapping platform 119.

By way of example, the UEs 117 are or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. In one embodiment, the UEs 117 can be robotic vacuums, floor cleaners, or other equivalent robotic devices capable of navigating by performing Simultaneous Mapping and Localization (SLAM) functions which could provide the base map of the available space 103 (e.g., room, home, flat, etc.). It is also contemplated that the UEs 117 can support any type of interface to the user (such as "wearable" circuitry, etc.). In one embodiment, the UEs 117 may be associated with or be a component of any other device.

In one embodiment, the UEs 117 are configured with various sensors 113 for generating or collecting sensor data 115 (e.g., LiDAR data, image data, probe data), related geographic data, etc. In one embodiment, the sensed data represent sensor data associated with a geographic location or coordinates at which the sensor data was collected. By way of example, the sensors 113 may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, LiDAR sensor/device, a camera/imaging sensor for gathering image data, an audio recorder for gathering audio data, and the like.

Other examples of sensors of the UEs 117 may include light sensors, orientation sensors augmented with height sensors and acceleration sensor, tilt sensors to detect the degree of incline or decline (e.g., slope) along a path of travel, moisture sensors, pressure sensors, etc. In one embodiment, the UEs 117 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 119, services platform 131, services 133, UEs 117, and/or content providers 135 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
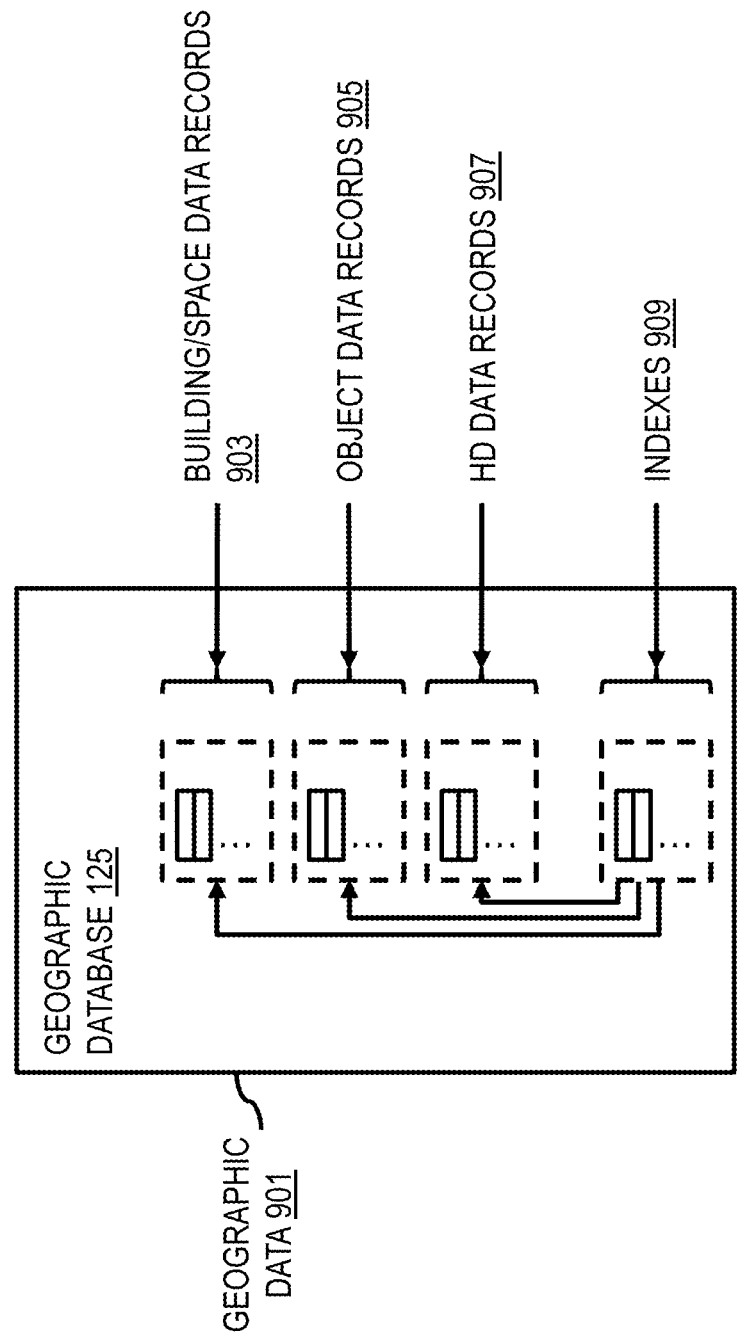
FIG. 9 is a diagram of a geographic database, according to one embodiment.

FIG. 9 is a diagram of a geographic database 125, according to one embodiment. In one embodiment, the geographic database 125 includes geographic data 901 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 901. In one embodiment, the geographic database 125 include high definition (HD) mapping data that provide centimeter-level or better accuracy of map features. For example, the geographic database 125 can be based on Light Detection and Ranging (LiDAR) or equivalent technology to collect 3D points and model available spaces 103 in which objects may be placed.

In one embodiment, the available spaces 103 (e.g., indoor spaces) and their features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference the available spaces 103 and/or objects 101 that can be placed therein. For example, the polylines or polygons can correspond to the boundaries or edges of the available spaces 103. In the case of a building, room, etc., a two-dimensional polygon can be used to represent a footprint of the building or available space 103, and a three-dimensional polygon extrusion can be used to represent the three-dimensional surfaces (e.g., including planar surfaces) of the building or available space 103. Accordingly, the terms polygons and polygon extrusions as used herein can be used interchangeably.

In one embodiment, the following terminology applies to the representation of geographic features of an available space 103 and/or object 101 in the geographic database 125.

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 125 follows certain conventions. For example, road links or any other linear geographic features (also referred to herein as links) do not cross themselves and do not cross each other except at a node. Also, there are no duplicated shape points, nodes, or links. Two links that connect each other have a common node. In the geographic database 125, overlapping geographic features are represented by overlapping polygons. When polygons overlap, the boundary of one polygon crosses the boundary of the other polygon. In the geographic database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 125 includes building/space data records 903, object data records 905, HD data records 907, and indexes 909, for example. More, fewer, or different data records can be provided. In one embodiment, additional data records (not shown) can include cartographic ("carto") data records, routing data, and maneuver data. In one embodiment, the indexes 909 may improve the speed of data retrieval operations in the geographic database 125. In one embodiment, the indexes 909 may be used to quickly locate data without having to search every row in the geographic database 125 every time it is accessed. For example, in one embodiment, the indexes 909 can be a spatial index of the polygon points associated with stored feature polygons. In one or more embodiments, data of a data record may be attributes of another data record.

In one embodiment, the building/space data records 903 store representations of the footprint or 3D models of buildings and/or other available spaces 103 (e.g., indoor spaces). The building/space data records 903 can be stored in a central database (e.g., network side) for public records (e.g., available spaces 103 in public buildings, points of interest, etc.) and/or in a local database (e.g., client device side) for private records (e.g., available spaces 103 in private homes or spaces). The building/space data records 903 can be associated with attributes, such as geographic coordinates, building/space types, physical dimensions, planar surfaces, spatial volumes, positions of objects 101 placed/stored within, etc. The geographic database 125 can include data about the buildings/spaces related to POIs and their respective locations in the building/space data records 903.

In one embodiment, the geographic database 125 can also include object data records 909 for storing the object spatial cost 105, available spatial budget 107, object spatial budget 111, geometrical costs 127, other cost data 129, and/or any other related data that is used or generated according to the embodiments described herein. By way of example, the object data records 909 can be associated with one or more of the node records 903, road segment records 905, and/or POI data records 907 to associate the object data records 909 with specific places (e.g., indoor places), POIs, geographic areas, and/or other map features. In this way, the object data records 909 can also be associated with the characteristics or metadata of the corresponding records 903, 905, and/or 907.

In one embodiment, as discussed above, the HD data records 907 model buildings, available spaces 103, related surfaces, and/or other map features to centimeter-level or better accuracy. The HD data records 907 also include space and/or object models that provide precise building/space/object geometries with polylines or polygonal boundaries, as well as rich attributes of the models. These rich attributes include, but are not limited to, object type, object location, object placement/orientation, object physical attributes, and/or the like. In one embodiment, the HD data records 907 are divided into spatial partitions of varying sizes to provide HD mapping data to end user devices with near real-time speed without overloading the available resources of the devices (e.g., computational, memory, bandwidth, etc. resources).

In one embodiment, the HD data records 907 are created from high-resolution 3D mesh or point-cloud data generated, for instance, from LiDAR sensors/devices-equipped vehicles. The 3D mesh or point-cloud data are processed to create 3D representations of a street or geographic environment at centimeter-level accuracy for storage in the HD data records 907. The spatial dimensions, volumes, etc. of the available spaces 103 and/or objects 101 can then be retrieved from the geographic database 125.

In one embodiment, the HD data records 907 also include real-time sensor data collected from probe devices (e.g., UEs 117) in the field. The real-time sensor data, for instance, integrates real-time positioning information with highly detailed 3D representations of buildings and/or available spaces 103 in which the probe devices are traveling to provide precise real-time mobility data or patterns (e.g., including probe data or trajectories) also at centimeter-level accuracy.

In one embodiment, the geographic database 125 can be maintained by the content provider 135 in association with the mapping platform 119 (e.g., a map developer or service provider). The map developer can collect geographic data to generate and enhance the geographic database 125. There can be different ways used by the map developer to collect data. These ways can include obtaining data from other sources, such as building owners, municipalities, or respective geographic authorities. In addition, the map developer can employ field personnel to survey buildings and/or available spaces 103 throughout a geographic region to observe features and/or record information about them, for example. Also, remote sensing, such as aerial or satellite photography, can be used.

The geographic database 125 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

The processes described herein for associating an object 101 with a spatial budget may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 10:
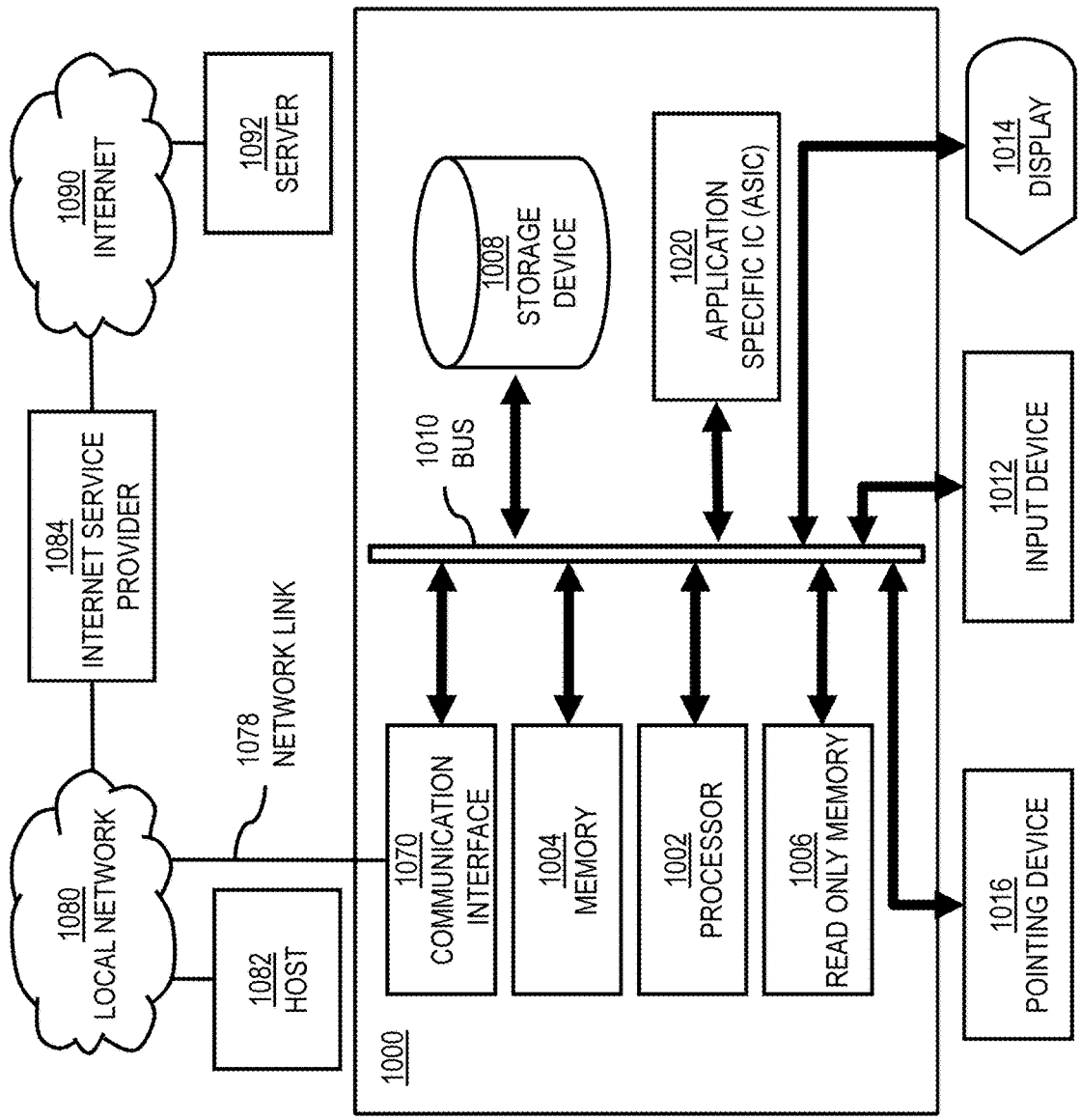
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to associate an object 101 with a spatial budget as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to associating an object 101 with a spatial budget. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for associating an object 101 with a spatial budget. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for associating an object 101 with a spatial budget, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 121 for associating an object 101 with a spatial budget.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to associate an object 101 with a spatial budget as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to associate an object 101 with a spatial budget. The memory 1105 also stores the data associated with or generated by the execution of the inventive steps.

Figure 12:
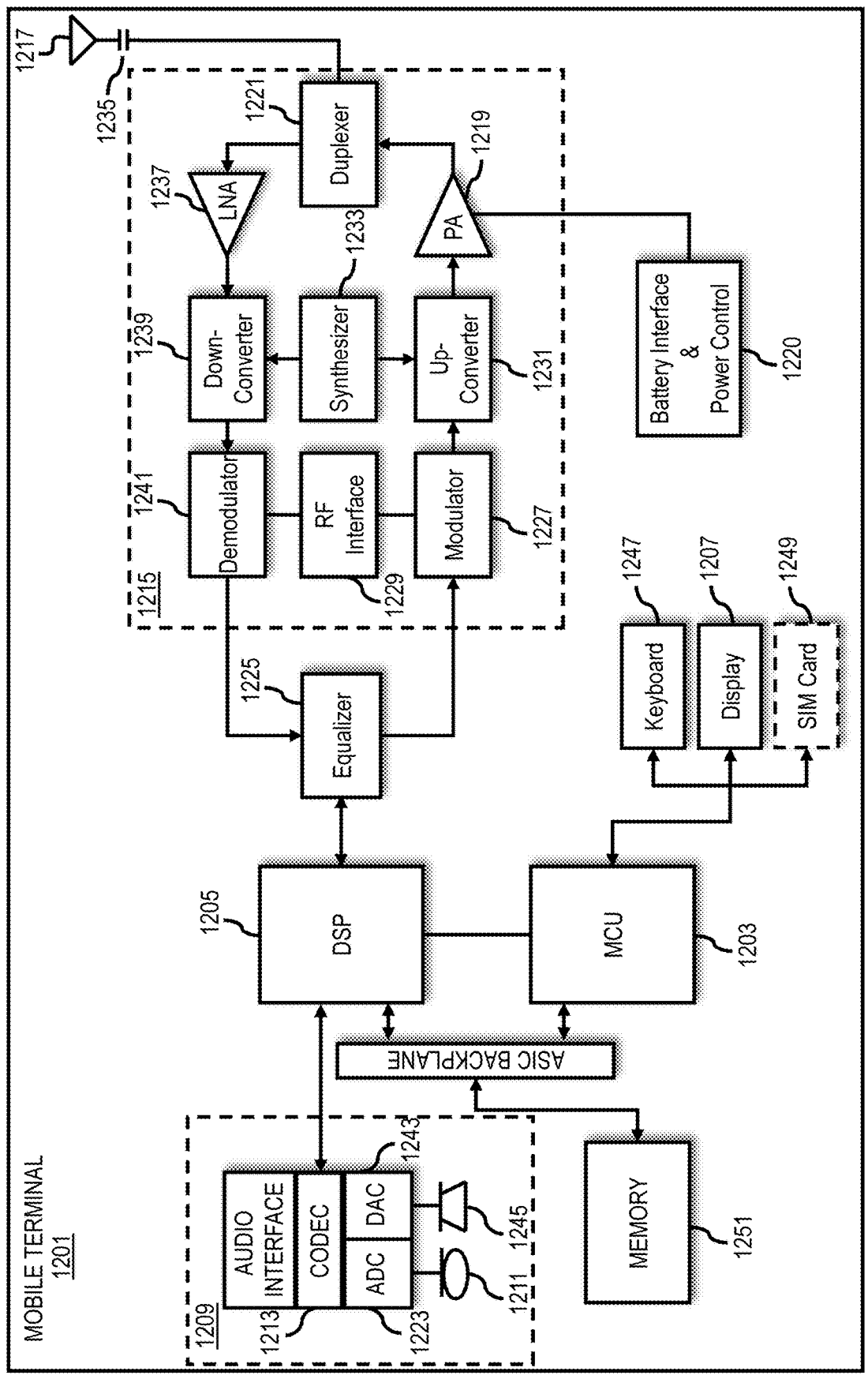
FIG. 12 is a diagram of a mobile terminal (e.g., handset or vehicle or part thereof) that can be used to implement an embodiment.

FIG. 12 is a diagram of exemplary components of a mobile terminal 1201 (e.g., UE 117 or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to associate an object 101 with a spatial budget. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    initiating a scan of an object, an available space, or a combination thereof using a sensor to determine a spatial volume of the object, a spatial volume of the available space for a storage or a placement of the object, or a combination thereof;
    determining a spatial cost of an object based on the spatial volume of the object;
    determining an available spatial budget based on the spatial volume of the available space;
    determining an opportunity cost of the object based on an area of a plane surface that would be rendered unavailable to another object by the storage or the placement of the object;
    determining a spatial budget for the object based on a ratio of the spatial cost of the object to the available spatial budget and based on the opportunity cost; and
    providing the spatial budget of the object, the spatial cost of the object, the available spatial budget, or a combination thereof as an output.

2. The method of claim 1, further comprising:
    determining a recommended position to place or store the object in the available space based on the spatial budget of the object.

3. The method of claim 2, further comprising:
    initiating the determining of the recommended position based on an acquisition or a request to acquire the object.

4. The method of claim 1, further comprising:
    determining a financial cost for the object based on the spatial budget and a real estate cost for the available space.

5. The method of claim 1, further comprising:
    partitioning the available space into one or more volumetric pixels (voxels),
    wherein the available spatial budget, the spatial budget of the object, or a combination thereof is represented based on the one or more voxels.

6. The method of claim 5, further comprising:
    computing a utility metric respectively for the one or more voxels based on a utility function,
    wherein the spatial budget of the object is further based on the utility metric.

7. The method of claim 6, further comprising:
    retrieving probe data collected from one or more devices moving within the available space; and
    processing the probe data to determine a mobility graph of the one or more devices,
    wherein the mobility graph represents one or more paths of the one or more devices within the available space; and
    wherein the utility metric is based on the mobility graph.

8. The method of claim 7, wherein the one or more voxels through which the one or more paths of the one or more devices passes are assigned a higher spatial cost than the one or more voxels through which the one or more paths do not pass.

9. The method of claim 1, further comprising:
    determining a geometrical cost of the object based on a shape of the object,
    wherein the geometrical cost of the object is the spatial volume of the object plus an additional spatial volume that is blocked by the object from being used by another object; and
    wherein the spatial cost of the object is further based on the geometrical cost.

10. The method of claim 1, further comprising:
determining a contextual cost of the object based on one or more additional volumes of the available space that would be rendered unavailable to another object by the storage or the placement of the object,
wherein the spatial cost of the object is further based on the contextual cost.

11. The method of claim 1, further comprising:
determining a visual cost of the object based on determining that the storage or the placement of the object blocks a line-of-sight view to another object,
wherein the spatial cost of the object is further based on the visual cost.

12. An apparatus comprising:
at least one processor; and
at least one memory including computer program code for one or more programs,
the at least one memory and the computer program code configured to, with the at least one processor, cause the apparatus to perform at least the following,
  initiate a scan of an object, an available space, or a combination thereof using a sensor to determine a spatial volume of the object, a spatial volume of the available space for a storage or a placement of the object, or a combination thereof;
  determine a spatial cost of an object based on the spatial volume of the object;
  determine an available spatial budget based on a spatial volume of the available space;
  determine an opportunity cost of the object based on an area of a plane surface that would be rendered unavailable to another object by the storage or the placement of the object;
  determine a spatial budget for the object based on a ratio of the spatial cost of the object to the available spatial budget and based on the opportunity cost; and
  provide the spatial budget of the object, the spatial cost of the object, the available spatial budget, or a combination thereof as an output.

13. The apparatus of claim 12, wherein the apparatus is further caused to:
determine a recommended position to place or store the object in the available space based on the spatial budget of the object.

14. The apparatus of claim 13, wherein the apparatus is further caused to:
initiate the determining of the recommended position based on an acquisition or a request to acquire the object.

15. The apparatus of claim 12, wherein the apparatus is further caused to:
determine a financial cost for the object based on the spatial budget and a real estate cost for the available space.

16. A non-transitory computer-readable storage medium carrying one or more sequences of one or more instructions which, when executed by one or more processors, cause an apparatus to perform:
initiating a scan of an object, an available space, or a combination thereof using a sensor to determine a spatial volume of the object, a spatial volume of the available space for a storage or a placement of the object, or a combination thereof;
determining a spatial cost of an object based on the spatial volume of the object;
determining an available spatial budget based on a spatial volume of the available space;
determining an opportunity cost of the object based on an area of a plane surface that would be rendered unavailable to another object by the storage or the placement of the object;
determining a spatial budget for the object based on a ratio of the spatial cost of the object to the available spatial budget and based on the opportunity cost; and
providing the spatial budget of the object, the spatial cost of the object, the available spatial budget, or a combination thereof as an output.

17. The non-transitory computer-readable storage medium of claim 16, wherein the apparatus is caused to further perform:
determining a recommended position to place or store the object in the available space based on the spatial budget of the object.

18. The non-transitory computer-readable storage medium of claim 17, wherein the apparatus is caused to further perform:
initiating the determining of the recommended position based on an acquisition or a request to acquire the object.

19. The non-transitory computer-readable storage medium of claim 16, wherein the apparatus is caused to further perform:
determining a financial cost for the object based on the spatial budget and a real estate cost for the available space.

* * * * *